March 18, 1969 B. B. NEIGER 3,433,962

DIRECT CURRENT AMPLIFIER EMPLOYING PHOTOELECTRIC CHOPPER WITH INCANDESCENT DRIVERS

Filed Oct. 14, 1966

INVENTOR:
BENJAMIN B. NEIGER

BY J. B. Burke

ATTORNEY.

United States Patent Office 3,433,962
Patented Mar. 18, 1969

3,433,962

DIRECT CURRENT AMPLIFIER EMPLOYING PHOTOELECTRIC CHOPPER WITH INCANDESCENT DRIVERS

Benjamin B. Neiger, Brooklyn, N.Y., assignor to Clariex Corporation, New York, N.Y., a corporation of New York Filed Oct. 14, 1966, Ser. No. 586,724
U.S. Cl. 250—209 10 Claims
Int. Cl. H01j *39/12*

This invention relates generally to direct current amplifiers and more particularly to a stable, high gain direct current amplifier circuit employing a photoelectric light chopper or modulator with pulsed incandescent lamp drivers.

Heretofore direct current amplifiers have frequently employed mechanical light choppers or motor driven shutters to effect light chopping or light modulation. The moving parts, contact noise and stray magnetic fields present in such mechanical light choppers have always been objectionable because they have made it difficult or impossible to amplify and measure with precision very small direct current inputs. Electronic photochoppers have been proposed but they too have many objectionable features. They usually employ neon lamps to generate the light which chopped or modulated. The neon lamps have the objectionable characteristic of producing very high light peaks or spikes upon being fired. These light peaks are due to pickup of stray electrostatic fields or other spurious, extraneous signals. These light peaks cause errors in measuring small direct voltage and current inputs. Another objection to the use of neon lamps in light choppers is that they require high voltage alternating current power supplies. This means that auxiliary transformers, voltage regulators and other expensive circuitry must be provided to convert the commercially available 110–120 volts A.C. to the particular high voltages required to drive the neon lamps. The use of current taken from A.C. power lines introduces further difficulties due to pickup of noise, hum, leakage currents, electrostatic charges, transients, etc.

The present invention avoids the above difficulties and disadvantages by providing a new type of direct current amplifier. The new amplifier employs an astable multivibrator to oscillate between two unstable states. The multivibrator triggers two transistors alternately to conduct and produce square pulses. The transistors alternately drive differentiators to produce spike pulses which are applied to two incandescent lamps having resistive filaments. These lamps are overdriven momentarily and almost instantaneously by large current pulses which are many times, ten times or more, the normal rated current of the lamps. The lamps are pulsed on and off alternately and they drive optically associated and coupled photoelectric cells. The photoelectric cells produce recurrent D.C. voltage pulses whose amplitude is determined by the direct current input to the D.C. amplifier. The D.C. input signal is chopped (modulated) into a train of D.C. pulses approximating a square wave. This square wave train is applied to an A.C. amplifier such as a transistor amplifier to produce an amplified A.C. output. The output of the amplifier is then synchronously rectified (demodulated) to a pulsating D.C. wave train by further photoelectric cells optically coupled to the incandescent lamps. A smoothing filter smooths the pulsating wave train and provides an amplified D.C. signal which can be applied to a suitable indicator such as a meter, or to any appropriate load circuit.

An important feature of the invention is the use of a low voltage D.C. power supply as a sole source of power to energize the device. This D.C. power supply can be a single cell battery, which makes the device wholly portable and not dependent on a fixed A.C. power supply. The device is thus immune to and removed from power line disturbances. Since incandescent lamps are used which light when their resistive filaments are heated, there are avoided the spurious light spikes characteristic of neon lamps flashed on periodically as is done in conventional electronic light choppers. There are no moving mechanical parts in the present device. It is light in weight, relatively simple in construction, inexpensive to manufacture, and easy to service.

It is therefore a principal object of the invention to provide a novel and improved photoelectrically controlled direct current amplifier circuit.

Another object is to provide a direct current amplifier with a photoelectric chopper employing momentarily overdriven incandescent lamps.

A further object is to provide a direct current amplifier in which any one of a variety of photoelectric cells can be used such as photoconductive or photoresistive cells, photovoltaic cells, photodiodes, phototransistors, vacuum phototubes, photosensitive silicon controlled rectifiers, etc.

Another object is to provide a small, compact, simplified direct current amplifier which can be energized by a low voltage portable battery.

Another object is to provide a direct current amplifier employing photoelectric cells both as light modulators and as synchronous light demodulators.

Other and further objects and advantages of the invention will become apparent from the following detailed description taken together with the drawing wherein.

Figure 1:
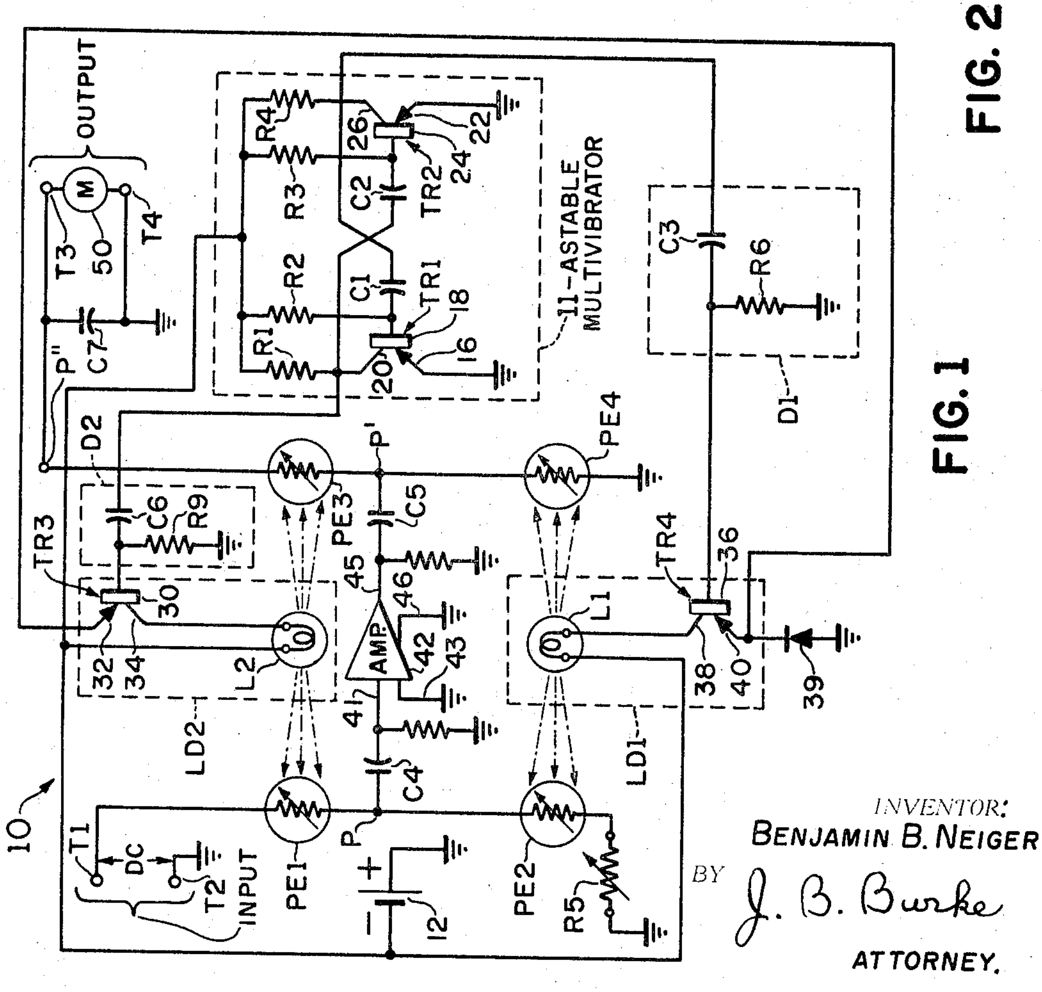
FIG. 1 is a diagram of an electric circuit embodying the invention.

Referring to the drawing, the circuit 10 shown in FIG. 1 includes an astable multivibrator 11 having two transistors TR1 and TR2. Transistor TR1 has an emitter 16, base 18 and collector 20. Transistor TR2 has emitter 22, base 24 and collector 26. Capacitor C1 is connected between base 18 of the transistor TR1 and the collector 26 of transistor TR2. Capacitor C2 is connected between base 24 and collector 20. Load resistors R1 and R4 are connected to the negative terminal of a single cell battery 12. The positive terminal of the battery and emitters 16, 22 are grounded. The output of transistor TR2 is applied from collector 26 to capacitor C3 in differentiator D1, which also includes grounded resistor R6. The output of transistor TR1 is applied to capacitor C6 of differentiator D2 which also includes grounded resistor R9.

The differentiator D1 applies pulses to the base 36 of a transistor TR4. This transistor has collector 38 connected in series with incandescent lamp L1 which in turn is connected to the negative terminal of battery 12. A diode rectifier 39 is connected between ground and the emitters 32 and 40 of transistors TR3 and TR4.

The differentiator D2 applies pulses to the base 30 of transistor TR3. This transistor has collector 34 connected in series with incandescent lamp L2 which in turn is connected to the negative terminal of battery 12. Lamp L1 and transistor TR4 constitute parts of lamp driver circuit LD1. Lamp L2 and transistor TR3 constitute parts of a second lamp driver circuit LD2. Rectifier diode 39 is common to both lamp driver circuits.

Photoelectric cells PE1 and PE2 are disposed optically adjacent to lamps L2 and L1 respectively to serve as light modulating devices. Photoelectric cells PE3 and PE4 are disposed adjacent to lamps L2 and L1 respectively to serve as light demodulators and rectifiers. These light demodulators operate in true synchronism with cells PE1 and PE2 because of their common optical association with the same lamps L2, L1 respectively.

The D.C. input terminal T1 of the amplifier circuit 10 is connected in series with photoelectric cell PE1 to junction point P. Terminal T2 is grounded. Junction point P is connected to capacitor C4 at one input terminal 41 of an A.C. amplifier 42. The other amplifier input terminal 43 is grounded. Connected between junction point P and ground is photoelectric cell PE2 in series with adjustable resistor R5. One output terminal 45 of the amplifier 42 is connected via a capacitor C5 to junction point P′. The other amplifier output terminal 46 is grounded. Connected to junction point P′ is one end of each photoelectric cell PE3 and PE4. The other end of cell PE4 is grounded. The other end of cell PE3 is connected to point P″ which is in turn connected to amplifier circuit output terminal T3. A large capacitor C7 which acts as a smoothing filter is connected between terminal T3 or point P″ and ground. Circuit output terminals T3 and T4 may be connected to a meter 50 or to some other indicator, or to an appropriate load circuit.

In operation of the direct current amplifier 10, a very small D.C. voltage will be applied to terminals T1, T2. This voltage will generally be so small that it would not register if applied directly to meter 50, even though this may be a microammeter. The invention thus makes it possible to sense the presence of and to measure accurately a very small applied input voltage or current. The way this is done will be explained in connection with the waveforms A–N of FIG. 2.

Waveform A shows a D.C. input voltage of small magnitude with respect to zero level or ground. Waveforms B and C shows two square wave pulse trains differing in phase by 180° produced by the transistors TR1 and TR2 respectively when these transistors are conducting in multivibrator 11. The astable multivibrator is a square wave generator that oscillates between two unstable states. Positive feedback is provided by the capacitive cross coupling from the collector of each transistor TR1 and TR2 to the base of the other transistor. The loop gain is greater than unity. Assuming that transistor TR1 is on, i.e. conducting and transistor TR2 is off, capacitor C2 is charged through resistor R3, the base of transistor TR2 goes negative and brings transistor TR2 into conduction. Regenerative switching occurs and transistor TR1 is now in nonconducting state. Now capacitor C1 becomes charged through resistor R2 and transistor TR1 conducts again while transistor TR2 switches off. Then the cycle begins again. The frequency of the multivibrator is determined by capacitors C1, C2 and resistors R2, R3. It may be stated that the frequency $f$ of the multivibrator is approximately:

$$f=.7\frac{1}{R2\times C1}=.7\frac{1}{R3\times C2}$$

Figure 2:
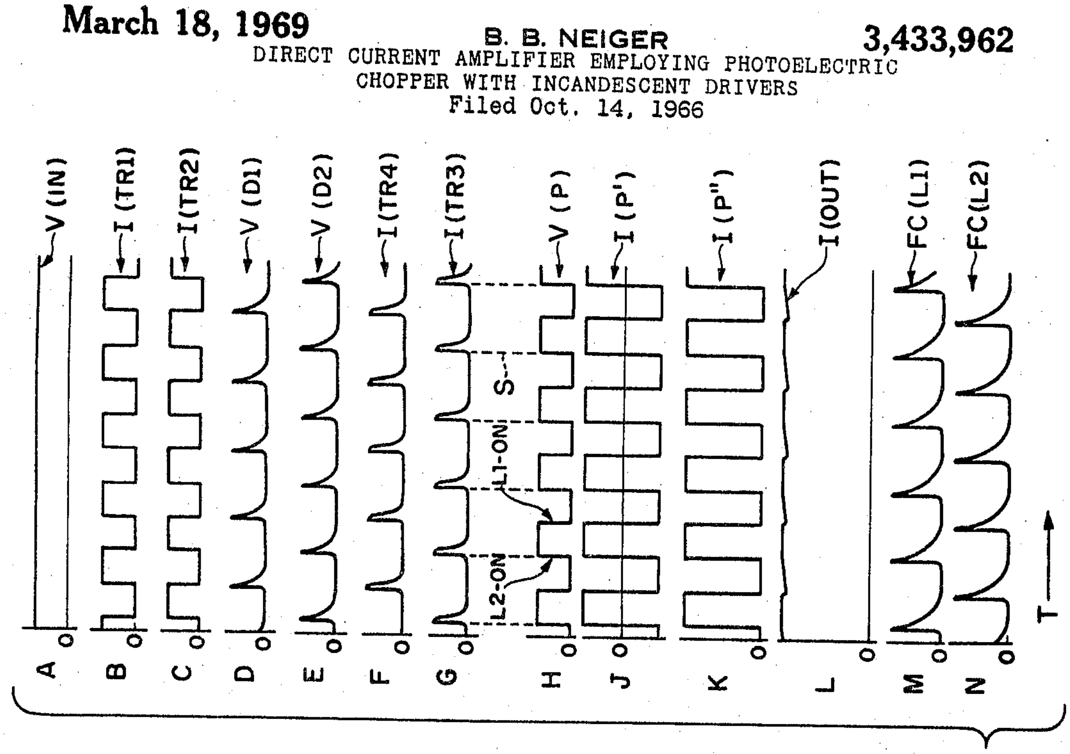
FIG. 2 shows idealized waveforms of voltages and currents at various points in FIG. 1, and is used in explaining the operation of the invention.

Since $R2\times C1=R3\times C2$, the output waveforms B and C of FIG. 2 are symmetrical as shown in the drawing. The multivibrator causes each transistor in turn to become conductive at a frequency rate determined by the capacitors C1, C2 and resistors R2, R3. When each transistor becomes conductive it applies a square pulse to its associated differentiator D1 or D2. Each differentiator then differentiates the applied square pulses and produces the peaked pulses as shown by waveforms D and E. The peaks of waveforms D and E occur alternately. The differentiated pulses D are applied to the lamp driver LD1.

Lamp driver LD1 employs a single transistor amplifier TR4 which operates between cut-off and saturation. When the incoming negative pulse from differentiator D1 exceeds the emitter-base voltage of the transistor TR4 plus the forward voltage of diode 39, the transistor TR4 conducts almost instantly. The current through lamp L1 is at least ten times the rated current of the lamp. This unusually high lamp drive current decreases the turn-on time of the lamp to only a few percent of the normally required turn-on time. The lamp life is not shortened in spite of the unusually high starting current because the high current is applied only instantaneously as indicated by the peaked current pulses of waveforms F in FIG. 2. Lamp driver LD2 is similarly actuated only momentarily by high current pulses applied by transistor TR3 as shown in waveform G. Thus both lamps L1 and L2 instantaneously light up alternately to maximum brilliance as shown by waveforms M and N where the pulses represent light output in footcandles (FC).

The lamp L1 simultaneously illuminates photoelectric cells PE2, PE4; lamp L2 simultaneously illuminates photoelectric cells PE1, PE3. The photoelectric cells are shown as photoresistors or photoconductors. The pulsating light outputs of the lamps drive these optically coupled photoelectric devices. When illuminated by the light pulse of a lamp, the electrical resistance of each cell drops to a fraction of its high value when the cell is in the dark. The alternate pulsating illumination of the lamps causes cells PE1, PE2 to act like single-pole double-throw switches. When lamp L2 lights, the resistance of cell PE1 drops and the input current at terminals T1, T2 is applied to amplifier 42. When lamp L1 lights ground voltage is applied to the amplifier 42 input while the dark cell PE1 has a high resistance. Waveform H shows the pulsed voltage at point P as lamps L1 and L2 alternately turn on. Thus the D.C. input signal is chopped or modulated to a square wave. This square wave is applied to the input of amplifier 42.

The square wave H is amplified by amplifier 42. Waveform J shows the amplified alternating current output as it appears at junction point P′. Photoelectric cells PE3 and PE4 are used as a synchronous rectifier or demodulator. It will be noted that cells PE3 and PE4 are illuminated and rendered conductive at the same time that cells PE1 and PE2 are illuminated. Thus cell PE3 conducts full current when it is illuminated, while cell PE4 conducts to ground when it is illuminated. The resulting waveform K shows amplified direct current appearing at point P″. After the amplified current passes the large capacitor C7, the current is smoothed as shown by waveform L. It is this amplified direct current output which is measured by meter 50 at output terminals T3, T4. Thus the amplifier 10 serves to amplify the low magnitude direct current applied at input terminals T1, T2 to high magnitude direct current at output terminals T3, T4.

It will be noted that a single small battery is sufficient to energize the entire amplifier 10. The lamps L1 and L2 consume very little energy because they are conducting alternately only about a millisecond at a time as indicated by waveforms G and F respectively even though the light output decays somewhat more slowly as shown by waveforms M and N. The amplitudes of the several waveforms in FIG. 2 are drawn to different scales and are plotted against time (T) in each case. The dotted lines S at the start of each pulse in waveform H represent the high voltage spikes which are eliminated by the use of incandescent lamps in the present invention. As mentioned above, it is these spikes which occur when neon lamps are used as light modulators. The neon lamps respond to spurious voltages that mask the input signals and cause misreadings of a meter at the output of the light modulator or chopper. Since modulator cells PE1, PE2 and demodulator cells PE3, PE4 are actuated by the same lamps synchronization is assured. The amplifier can be designed so that a particular modulation frequency is employed which ensures minimum pickup of extraneous noise and other spurious signals. The amplifier 10 can also be designed to employ other types of photoelectric cells than the photoresistive cells illustrated.

Although a limited number of embodiments of the invention have been described, it will be understood that this has been by way of explanation only, and that modifications can be made without departing from the scope of the appended claims.

What is claimed is:

1. A direct current amplifier, comprising:

input terminals for receiving direct current of very small magnitude from an external source;

a pair of incandescent lamps having resistive filaments and rated for carrying current of a certain magnitude;

means for applying momentary current pulses to the lamps to light the same alternately and momentarily, said current pulses having magnitudes several times larger than said certain magnitude; and a pair of photoelectric cells connected in circuit with the input terminals and disposed for illumination respectively and alternately by said lamps to produce a train of direct current pulses which can be amplified.

2. A direct current amplifier as recited in claim 1, wherein the means for applying momentary current pulses to the lamps, comprises:

an astable multivibrator for generating two trains of square pulses, the pulses in the two trains being phased 180° apart;

two differentiators connected to the multivibrator to receive therefrom the two trains of pulses to convert the same to two other trains of spiked pulses phases 180° apart; and a pair of transistor amplifiers connected to the differentiators respectively in circuit with a rectifier to conduct current momentarily when spiked pulses are applied thereto, said lamps being connected to the transistor amplifiers respectively so that current pulses having magnitudes many times larger than said certain magnitude are applied to the lamps alternately and momentarily to cause the lamps to emit peaked light pulses alternately.

3. A direct current amplifier as recited in claim 2, further comprising:

current amplification means connected to the photoelectric cells for producing amplified alternating pulses therefrom; and means for rectifying the amplified alternating pulses to produce amplified direct current pulses.

4. A direct current amplifier as recited in claim 3, wherein the last named means for rectifying the amplified alternating pulses comprises a second pair of photoelectric cells respectively disposed for illumination alternately by the incandescent lamps, so that rectification of the alternating pulses is synchronous with production of the direct current pulses by the first named photoelectric cells.

5. A direct current amplified as recited in claim 4, further comprising circuit output terminals; and smoothing filter means connected in circuit with the second pair of photoelectric cells so that smoothed amplified direct current is applied to the output terminals, the magnitude of the amplified direct current being many times larger than the magnitude of direct current applied to said input terminals.

6. A direct current amplifier as recited in claim 2, further comprising a low voltage direct current supply means connected in circuit with the multivibrator, lamps and transistor amplifiers to energize the same.

7. A direct current amplifier as recited in claim 6, wherein said direct current supply means is a battery.

8. A direct current amplifier as recited in claim 4, further comprising a low voltage battery connected in circuit with the multivibrator, lamps and transistor amplifiers to energize the same.

9. A direct current amplifier as recited in claim 5, wherein each of the photoelectric cells is a photoconductive unit which changes in electrical resistance when the cell is illuminated, whereby the train of direct current pulses produced by the first named pair of photoelectric cells is derived only from the direct current applied to the input terminals, and whereby the amplified direct current applied to the output terminals is derived only from said current amplification means via the second pair of photoelectric cells.

10. A direct current amplifier as recited in claim 2, wherein each of the photoelectric cells is a photoconductive unit which changes in electrical resistance when the cell is illuminated, so that the photoelectric cells operate like a repeatedly thrown single-pole double throw switch to produce the train of direct current pulses from the direct current received at the input terminals.

References Cited

UNITED STATES PATENTS

| | | | |
|---|---|---|---|
| 3,283,157 | 11/1966 | Blackmer | 250—209 |
| 3,222,528 | 12/1965 | Thorpe | 250—209 |
| 3,363,106 | 1/1968 | Park | 250—209 |
| 3,384,739 | 5/1968 | Connelly | 250—209 X |

JAMES W. LAWRENCE, *Primary Examiner.*

C. R. CAMPBELL, *Assistant Examiner.*

U.S. Cl. X.R.

250—208; 307—311; 330—10, 59